United States Patent
Rolfe et al.

(10) Patent No.: US 9,686,735 B2
(45) Date of Patent: Jun. 20, 2017

(54) SET OF OPTIMIZATIONS APPLICABLE TO A WIRELESS NETWORKS OPERATING IN TV WHITE SPACE BANDS

(71) Applicant: SILVER SPRINGS NETWORKS, INC., Redwood City, CA (US)

(72) Inventors: Benjamin A. Rolfe, Boulder Creek, CA (US); Kunal Pankaj Shah, Mountain View, CA (US); Jay Ramasastry, Reno, NV (US); Cristina Seibert, Mountain View, CA (US)

(73) Assignee: Silver Spring Networks, Inc., San Jose, CA (US)

( * ) Notice: Subject to any disclaimer, the term of this patent is extended or adjusted under 35 U.S.C. 154(b) by 81 days.

(21) Appl. No.: 14/061,689

(22) Filed: Oct. 23, 2013

(65) Prior Publication Data
US 2014/0269506 A1    Sep. 18, 2014

Related U.S. Application Data

(60) Provisional application No. 61/782,863, filed on Mar. 14, 2013.

(51) Int. Cl.
| | |
|---|---|
| *H04W 48/16* | (2009.01) |
| *H04W 72/04* | (2009.01) |
| *H04W 72/08* | (2009.01) |
| *H04W 8/00* | (2009.01) |
| *H04W 16/14* | (2009.01) |

(52) U.S. Cl.
CPC ............. *H04W 48/16* (2013.01); *H04W 8/00* (2013.01); *H04W 72/048* (2013.01); *H04W 72/08* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 6,249,681 B1 * | 6/2001 | Virtanen | ....................... 455/466 |
| 6,986,155 B1 * | 1/2006 | Courtney | ................ H04L 12/18 |
| | | | 725/109 |
| 7,318,234 B1 * | 1/2008 | Dharmarajan | .................... 726/2 |
| 7,778,187 B2 * | 8/2010 | Chaturvedi et al. | .......... 370/242 |
| 2001/0054101 A1 * | 12/2001 | Wilson | .................... H04L 12/14 |
| | | | 709/225 |

(Continued)

OTHER PUBLICATIONS

International Search Report for Application No. PCT/US2014/024013, dated Jul. 17, 2014.

*Primary Examiner* — Jenee Williams
(74) *Attorney, Agent, or Firm* — Artegis Law Group, LLP

(57) ABSTRACT

A server acts as a proxy mechanism for node registration with a database. The node initially registers to participate in a wireless mesh network by transmitting a registration request to the server. The server forwards the request to the database, which validates the request. The server records that the registration request was, in fact, validated by the database. The node is then permitted to participate in the network. If the node becomes decoupled from the network, the node may then transmit a re-registration request to the server. Since the server recorded that the previous registration was validated, the server may then simply validate the re-registration request, without interacting with the database.

22 Claims, 10 Drawing Sheets

(56) References Cited

U.S. PATENT DOCUMENTS

| | | | |
|---|---|---|---|
| 2002/0035699 A1* | 3/2002 | Crosbie | H04L 63/10 726/12 |
| 2002/0152373 A1* | 10/2002 | Sun | H04L 63/0209 713/150 |
| 2003/0145113 A1* | 7/2003 | Pickel | H04L 29/12009 709/245 |
| 2003/0211843 A1* | 11/2003 | Song | H04W 76/002 455/411 |
| 2004/0264439 A1* | 12/2004 | Doherty | H04L 29/06027 370/352 |
| 2005/0186908 A1* | 8/2005 | Shin et al. | 455/41.2 |
| 2005/0198383 A1* | 9/2005 | Rose | H04L 12/24 709/245 |
| 2005/0200883 A1* | 9/2005 | Mannion | G06F 3/1203 358/1.15 |
| 2005/0202849 A1* | 9/2005 | Ignatin | 455/564 |
| 2005/0229245 A1* | 10/2005 | Nakano et al. | 726/14 |
| 2006/0059251 A1* | 3/2006 | Cunha | H04L 67/1008 709/223 |
| 2006/0130135 A1* | 6/2006 | Krstulich et al. | 726/15 |
| 2006/0248342 A1* | 11/2006 | Bajar | H04L 9/3271 713/182 |
| 2007/0206610 A1* | 9/2007 | Teodosiu et al. | 370/400 |
| 2008/0165945 A1* | 7/2008 | Vadlakonda et al. | 379/204.01 |
| 2008/0311938 A1 | 12/2008 | Song | |
| 2009/0097530 A1 | 4/2009 | Dhodapkar et al. | |
| 2009/0240794 A1* | 9/2009 | Liu | H04L 29/08846 709/223 |
| 2010/0150170 A1* | 6/2010 | Lee | H04L 41/0213 370/466 |
| 2010/0165836 A1* | 7/2010 | Wahlqvist | H04W 76/028 370/225 |
| 2010/0202426 A1* | 8/2010 | Matsuda et al. | 370/338 |
| 2010/0278037 A1* | 11/2010 | Jen et al. | 370/216 |
| 2011/0087762 A1* | 4/2011 | Wang | H04L 41/0816 709/221 |
| 2011/0090878 A1 | 4/2011 | Seibert et al. | |
| 2012/0084840 A1* | 4/2012 | Higuchi | H04L 49/354 726/4 |
| 2012/0163177 A1 | 6/2012 | Vaswani et al. | |
| 2012/0173758 A1 | 7/2012 | Flammer et al. | |
| 2012/0198006 A1* | 8/2012 | Moayerzadeh Ahmadi | H04L 51/38 709/206 |
| 2012/0281527 A1* | 11/2012 | Sebire | H04W 76/028 370/228 |

\* cited by examiner ical patent application titled "A Set of Optimizations
SET OF OPTIMIZATIONS APPLICABLE TO A WIRELESS NETWORKS OPERATING IN TV WHITE SPACE BANDS

CROSS-REFERENCE TO RELATED APPLICATIONS

This application claims the benefit of United States provisional patent application titled "A Set of Optimizations Applicable to Wireless Networks Operating in TV White Space Bands," filed on Mar. 14, 2013 and having Ser. No. 61/782,863. The subject matter of this related application is hereby incorporated herein by reference.

BACKGROUND OF THE INVENTION

Field of the Invention

Embodiments of the present invention relate generally to wireless digital communication and, more specifically, to a set of optimizations applicable to wireless networks operating in television (TV) whitespace bands.

Description of the Related Art

A conventional network system generally includes a collection of different nodes configured to interoperate with one another. Those nodes may be configured to communicate with one another on a variety of different channels, including, for example, television whitespace (TVWS) channels.

When a node initially joins a network of devices that communicate on TVWS channels, the node initiates a registration procedure with an access point in order to become authorized to communicate on one or more specific TVWS channels. In doing so, the node typically transmits a registration request to the access point. The access point may then communicate with a TVWS database in order to validate the registration request. The TVWS database stores, among other things, data indicating available TVWS channels in particular regions. When validating a registration request, the TVWS database generally provides a channel map for the node that indicates a list of available channels in the region occupied by the node.

In order to comply with federal communications committee (FCC) regulations, the registration request should include various types of information associated with the node. Specifically, the registration request should include a node address (e.g. media access control (MAC) address or Internet protocol (IP) address), a federal communication committee (FCC) identification number, a node serial number, the location of the node, the height of an antenna associated with the node, the name of the business that owns the node, and contact information for a person responsible for the node (name, street address, email address, and telephone number). The TVWS database relies on this information in order to validate the registration request.

In some situations, the node must initiate the registration procedure after having already registered to participate in the network. For example, if the node changes locations and becomes coupled to a new access point, the node would need to register with that new access point in order to participate in the network. Alternatively, if the node reboots (or the access point to which the node is coupled reboots), then the node would need to register with the access point again in order to participate in the network. Each time the node registers to participate in the network, the node must provide all of the information described above within the registration request. Similarly, the access point must perform the validation procedure described above and communicate that information to the TVWS database.

One problem with this approach is that a node may switch access points frequently, and, thus, the registration procedure described above may need to be performed repeatedly. For example, a modern node may be incorporated into a mobile device and may thus migrate between different regions associated with different access points. The node would thus need to register with each different access point upon entering each different region. Each registration request issued by the node includes data that is mostly identical to data associated with previous registration requests issued by the node. Consequently, the network may become clogged with registration requests that include mostly redundant data.

As the foregoing illustrates, what is needed in the art is an improved technique for registering nodes to participate in a TVWS network.

SUMMARY OF THE INVENTION

One embodiment of the present invention sets forth a computer-implemented method for registering a node to participate in a network, including receiving from a first node a first request to participate in the network from node, where the first request includes information that identifies the first node, permitting the first node to participate in the network, notifying the first node that participation in the network has been permitted, receiving from the first node a second request to participate in the network after the first node has become decoupled from the network, where the second request includes a subset of the information included in the first request that identifies the first node, determining that the node has already been permitted to participate in the network, and notifying the node that participation in the network has again been permitted.

One advantage of the disclosed technique is that network traffic may be reduced because node re-registration requests include far less data than initial node registration requests. Thus, when a node migrates between access points and temporarily becomes de-coupled from the network, the node need not transmit redundant registration information in order to re-join the network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
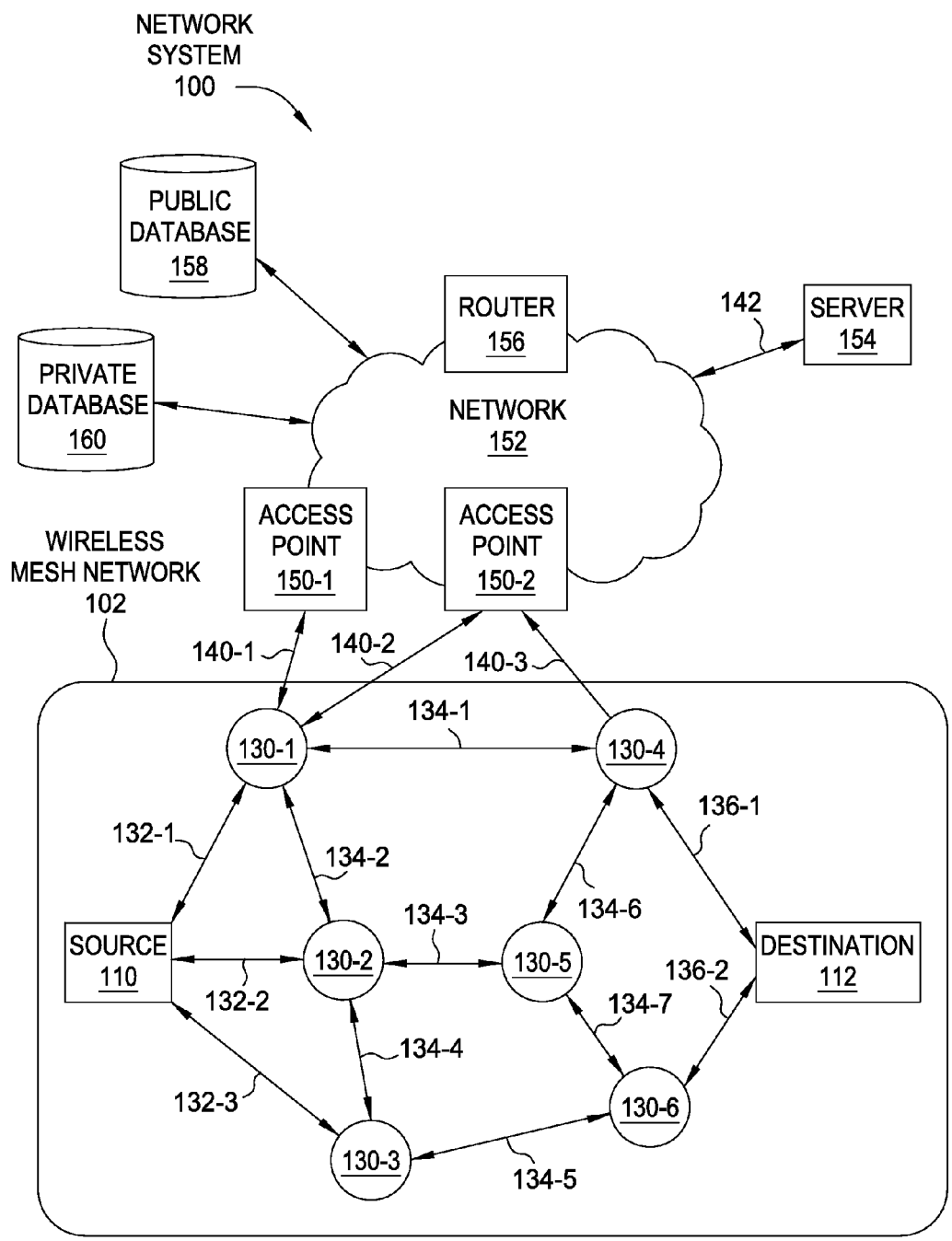
FIG. 1 illustrates a network system, according to one embodiment of the present invention.

FIG. 1 illustrates a network system 100, according to one embodiment of the present invention. The network system 100 includes, without limitation, a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include one or more access points 150, a network 152, a server 154, a router 156, a public database 158, and a private database 160. As a general matter, any of the elements of network system 100, such as, e.g., nodes 130, server 154, and so forth, may operate as a source node, a destination node, or an intermediate node for payload data that is communicated across network system 100 and/or wireless mesh network 102.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. One skilled in the art will understand that any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

The nodes 130 are configured to communicate with one another on many different channels, although the set of channels available to the nodes 130 may be limited for various reasons. For example, the nodes 130 may reside proximate to a TV tower that transmits on a particular TV channel, and so the nodes 130 may be restricted from communicating on that particular channel. A given node 130 may acquire a list of available channels associated with a region occupied by that node 130 from the public database 158. The public database 158 includes channel availability data for a wide variety of different regions where the node 130 may reside. The node 130 may query the public database 158 directly for the list of available channels, although in practice, the node 130 relies on the server 154 to perform such queries on behalf of the node 130. The node 130 may communicate with the server 154 via one or more of the access points 150. In one embodiment, the public database 158 is a TVWS database that includes a list of available TV channels within various regions.

The node 130 may also acquire a quality of service (QOS) value for each channel that is available in a region where the node 130 may reside. The private database 160 includes channel QOS values for various channels associated with different regions. The node 130 may query the private database 160 directly for QOS values associated with a list of channels, although in practice, the node 130 relies on the server 154 to perform such queries on behalf of the node 130. Again, the node 130 may communicate with the server 154 via one or more of the access points 150. The server 154 may interact with the private database 160 in order to determine the QOS values for each available channel and then select, from the list of available channels, those channels that have a QOS value that is sufficient for the operating requirements of the node 130.

In the context of this disclosure, a "channel map" represents one or more lists of available channels associated with one or more regions. A channel map may be derived from information stored within public database 158 and/or private database 160. A channel map may include a list of available channels associated with just one region, or many lists of channels, where each list corresponds to a different region. A channel map may also include QOS values for available channels, or, alternatively, lists of channels that meet certain criteria, such as, e.g. a minimum QOS value.

In network system 100, each node 130 is configured to acquire channel maps and other data by way of access points 150. Each access point 150 is configured to communicate with one or more nodes 130 within the wireless mesh network 102. Communication may include transmission of payload data, timing data, channel maps, registration information, or any other technically relevant data, between the access point 150 and various nodes 130 within the wireless mesh network 102. For example, a communications link 140-1 may be established between the access point 150-1 and intermediate node 130-1 to facilitate transmission of payload data between wireless mesh network 102 and network 152. Each access point 150 is coupled to the network 152, which may comprise any wired, optical, wireless, or hybrid network configured to transmit payload data between the access point 150 and the server 154. Router 156 may be configured to coordinate communications between the access point 150 and the server 154 across communication link 142.

When a node 130 joins wireless mesh network 102, the node 130 initiates a registration procedure by transmitting a registration request and a channel map request to an access point 150 to which the node 130 is coupled. The registration request generally includes information that identifies the node and/or information related to the operation of the node 130. The registration request could include, for example, a media access control (MAC) address, a federal communication committee (FCC) identification (ID) number, a serial number, and other information that identifies the node 130. The registration request could also include, for example, an antenna height associated with the node and the location of the node, among other information associated with the operation of the node 130.

In response to the registration request, the access point 150 to which the node 130 is coupled initiates a registration validation procedure. In performing the registration validation procedure, the access point 150 interacts with the server 154 in order to (i) cause the server 154 to authorize the node 130 for operation and (ii) acquire a channel map for the node to satisfy the channel map request. The server 154 may interact with public database 158 and/or private database 160 on behalf of the access point 150 in order to authorize the node 130 for operation and acquire the channel map. In other words, the server 154 may act as a proxy for the access point 150 in order to facilitate the registration procedure. The registration procedure described herein is also described in greater detail below in conjunction with FIGS. 4A-4B, and 6-7.

At a later time, the node 130 may need to re-register with the access point 150 or with a new access point 150. The node 130 could, for example, have recently rebooted or recently changed locations and/or access points 150. As a general matter, the node 130 may need to re-join the wireless mesh network 102 and re-register with an access point 150 for a variety of different reasons. When the node 130 has already registered with an access point 150 within the wireless mesh network 102, and that access point 150 has already performed the initial registration procedure mentioned above, the node 130 may re-register with any access point 150 by initiating a re-registration procedure. The re-registration procedure represents a simplified version of the registration procedure previously described.

When the node 130 re-joins wireless mesh network 102, the node 130 initiates the re-registration procedure by transmitting a re-registration request and a channel map request to the access point 150 to which the node 130 is coupled. The node 130 may have been previously coupled to the access point 150 or newly coupled to that access point. The re-registration request includes only a subset of the information included within the initial registration request. In response to the registration request, the access point 150 initiates a re-registration validation procedure. In performing the re-registration validation procedure, the access point 150 interacts with the server 154 in order to validate the re-registration request and acquire a channel map for the node to satisfy the channel map request.

The server 154 may determine that a previous registration request issued by the node 130 was previously validated, and then provide the access point 150 with a registration validation, i.e. without explicitly authorizing the node 130 via public database 158. The server 154 may also acquire a new channel map for the node based on the position of the node 130. An advantage of the re-registration approach described herein is that a reduced amount of data needs to be transported across the wireless mesh network 102 when a node 130 re-joins that network, thereby decreasing network traffic. The registration procedure described herein is also described in greater detail below in conjunction with FIGS. 5A-5B, 6, and 8.

In one embodiment, the server 154 represents a destination for payload data originating within the wireless mesh network 102 and a source of payload data destined for one or more nodes within the wireless mesh network 102. In another embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In yet another embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting. An exemplary implementation of the server 154 is described in greater detail below in conjunction with FIG. 3.

The techniques described herein are sufficiently flexible to be utilized within any technically feasible network environment including, without limitation, a wide-area network (WAN), a local-area network (LAN), a personal area network (PAN), a TVWS network, a star network, and so forth. Moreover, multiple network types may exist within a given network system 100. For example, communications between two nodes 130 or between a node 130 and the corresponding access point 150 may occur via a radio-frequency local-area network (RF LAN), while communications between access points 150 across the network 152 may occur via a WAN such as a general packet radio service (GPRS). As mentioned above, each node within wireless mesh network 102 includes a network interface that enables the node to communicate wirelessly with other nodes. An exemplary network interface is described below in conjunction with FIG. 2.

Figure 2:
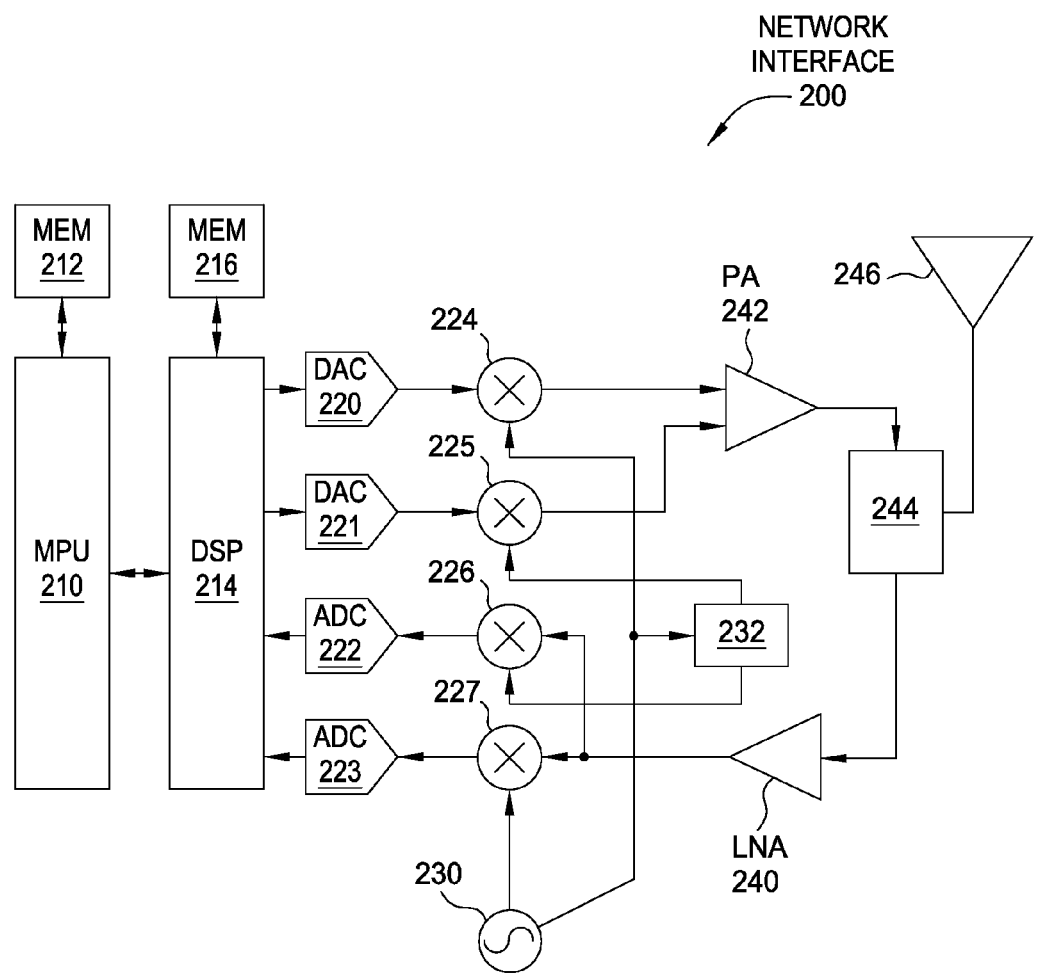
FIG. 2 illustrates a network interface configured to transmit and receive data within a wireless mesh network, according to one embodiment of the present invention.

FIG. 2 illustrates a network interface 200 configured to implement multi-channel operation, according to one embodiment of the present invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220 and 221, analog to digital converters (ADCs) 222 and 223, analog mixers 224, 225, 226, and 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 4-9, when MPU 210 executes a firmware program stored in memory within network interface 200.

The DSP 214 is coupled to DAC 220 and DAC 221. Each DAC 220 and 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222 and 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Figure 3:
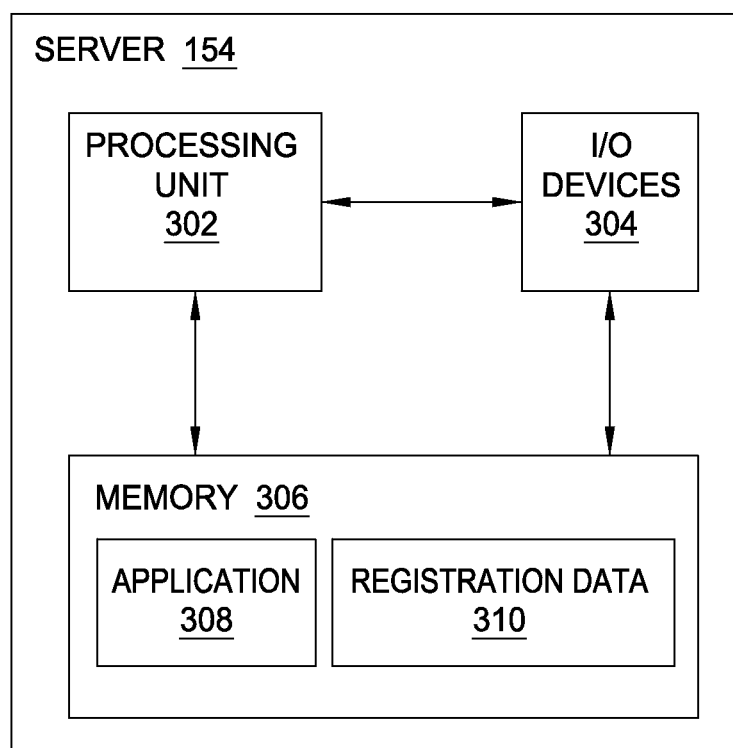
FIG. 3 is a block diagram illustrating the server of FIG. 1, according to one embodiment of the present invention.

FIG. 3 is a block diagram illustrating the server 154 of FIG. 1, according to one embodiment of the present invention. In this particular embodiment, server 154 comprises a computing device capable of processing data by executing program instructions stored in memory. Server 154 may also comprise any type of machine capable of processing data. As shown, server 154 includes, without limitation, a processing unit 302, input/output (I/O) devices 304, and memory 306. As also shown, processing unit 302, I/O devices 304, and memory 306 are coupled to one another.

Processing unit 302 may include one or more central processing units (CPUs), parallel processing units (PPUs), graphics processing units (GPUs), application-specific integrated circuits (ASICs), field-programmable gate arrays (FPGAs), or any other type of processing unit capable of processing data. In addition, processing unit 302 may include various combinations of processing units, such as, e.g., a CPU coupled to a GPU.

I/O devices 304 may include input devices, such as a keyboard, a mouse, a touchpad, a microphone, a video camera, and so forth, as well as output devices, such as a screen, a speaker, a printer, a projector, and so forth. In addition, I/O devices 304 may include devices capable of performing both input and output operations, such as a touch screen, an Ethernet port, a universal serial bus (USB) port, a serial port, etc. I/O devices 304, as well as processing unit 302 described above, are both configured to read data from and write data to memory 306.

Memory 306 may include a hard disk, one or more random access memory (RAM) modules, a database, and so forth. In general, any technically feasible unit capable of storing data may implement memory 306. Memory 306 includes an application 308 that may be executed by processing unit 302 to perform the various functions of server 154 described herein. Memory 306 also includes registration data 310 that includes registration requests previously received from nodes 130 that have registered to participate in the wireless mesh network 102. When one such node 130 attempts to re-register to participate in the wireless mesh network (e.g., following a node status change that decoupled the node 130 from the wireless mesh network 102), server 154 may validate the re-registration request by examining registration data 310 and verifying that the node 130 was previously registered.

With this approach, the server 154 need not validate re-registration requests by directly interacting with public database 158. Further, registration data 310 may store a wide variety of information that identifies the node 130 transmitting the re-registration request, and so the node 130 need only transmit a subset of that identifying information with the re-registration request. Based on that subset, the server 154 may retrieve any other stored identifying information associated with node 130 from the registration data 130.

Persons skilled in the art will recognize that the block diagram shown in FIG. 3 illustrates just one possible implementation of server 154, and that any system or combination of systems configured to perform the functionality of server 154 described herein falls within the scope of the present invention.

Optimizations for Wireless Networks Operating In TV White Space Bands

Figure 4A:
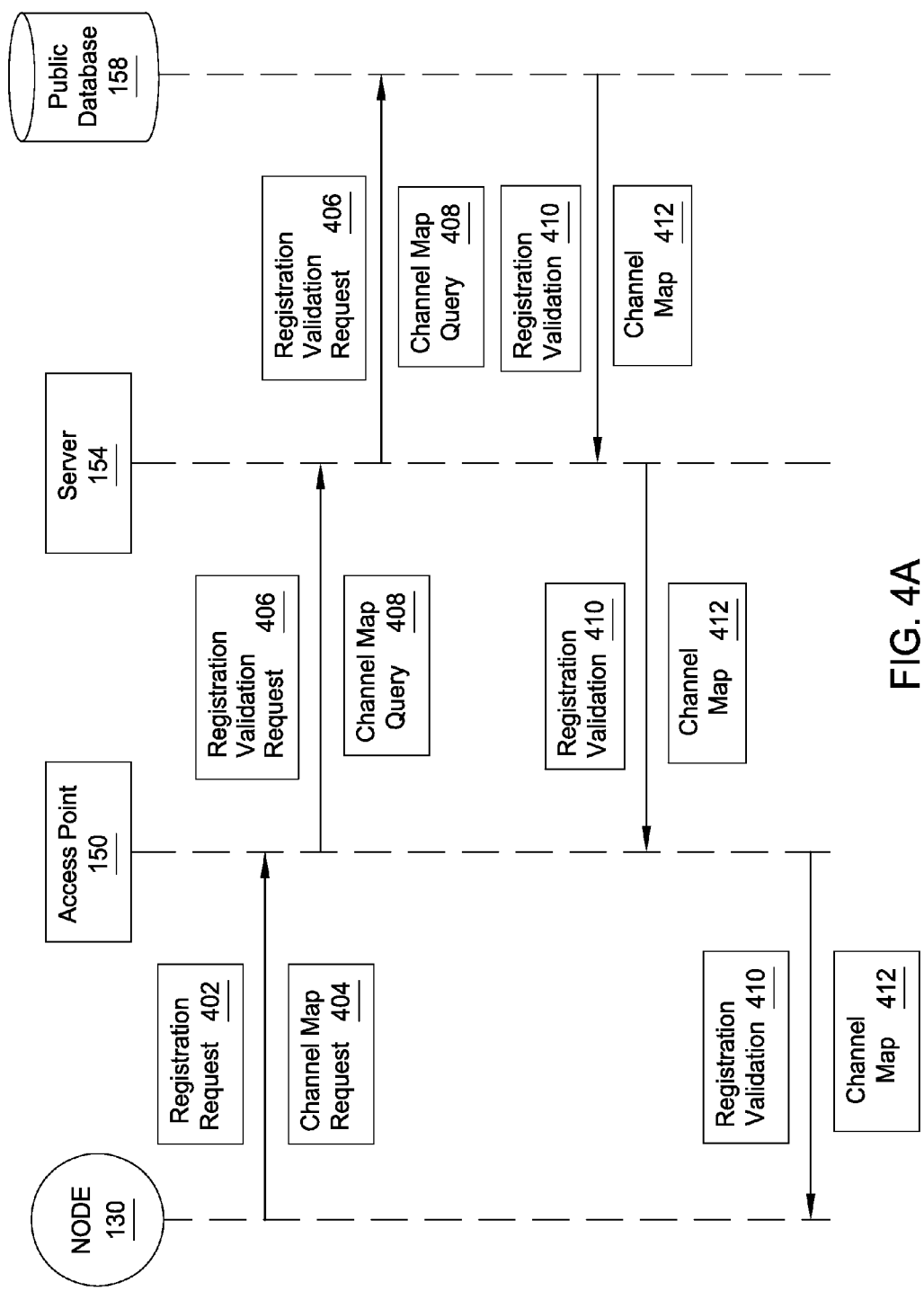
FIG. 4A is a conceptual diagram illustrating message exchanges between devices within the network system of FIG. 1 when a node registers to participate in the wireless mesh network of FIG. 1, according to one embodiment of the present invention.

FIG. 4A is a conceptual diagram illustrating message exchanges between devices within the network system of FIG. 1 when a node registers to participate in the wireless mesh network of FIG. 1, according to one embodiment of the present invention. As shown, FIG. 4A illustrates a sequence of messages that are transferred between node 130, access point 150, sever 154, and public database 158, each shown in FIG. 1. Access point 150 shown in FIG. 4A may be either of access points 150-1 and 150-2 shown in FIG. 1. The message transfer sequence shown in FIG. 4A is initiated when the node 130 initially attempts to join wireless mesh network 102 by transmitting a registration request 402 and a channel map request 404 to access point 150. The registration request 402 includes specific data that is shown in greater detail in FIG. 4B.

Figure 4B:
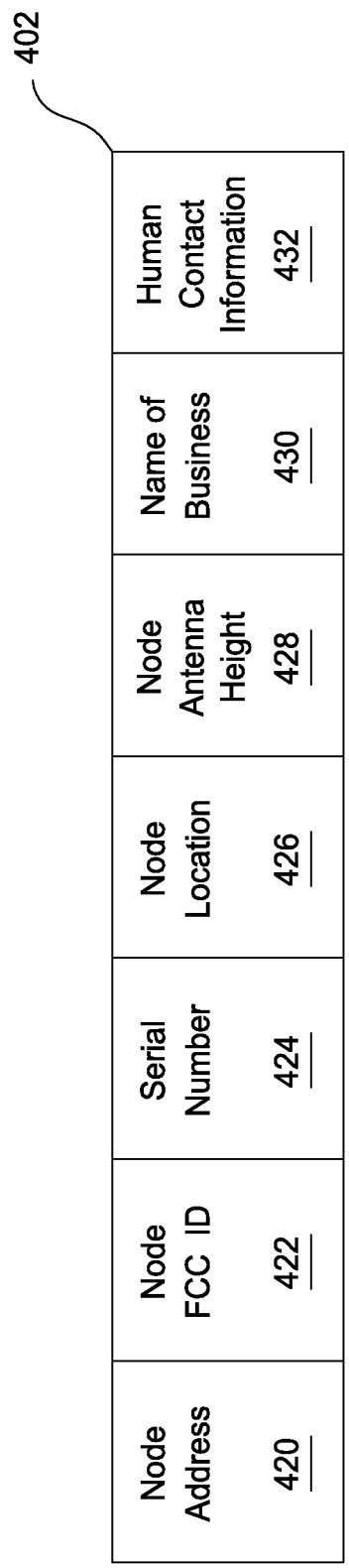
FIG. 4B is a more detailed diagram illustrating a registration request generated by a node when the node registers to participate in the wireless mesh network of FIG. 1, according to one embodiment of the present invention.

FIG. 4B is a more detailed diagram illustrating a registration request generated by a node when the node registers to participate in the wireless mesh network of FIG. 1, according to one embodiment of the present invention. As shown, registration request 402 includes node address 420, node FCC ID 422, serial number 424, node location 426, node antenna height 428, name of business 430, and human contact information 430. Node address 420 could be a hardware address such as, e.g., a media access control (MAC) address. Node FCC ID 422 is a unique string of alphanumeric characters assigned by the FCC to node 130. Serial number 424 may be a number assigned by a manufacturer of node 130. Node location 426 may include latitude and longitude values that reflect the physical position of node 130. Node antenna height specifies a linear distance between the Earth and an antenna with which node 130 relies on for communication purposes. Name of business 430 typically reflects the name of a corporation or other legal entity that is responsible for node 130. Human contact information 432 includes the name, street address, email address, and phone number of a person associated with the legal entity to which node 130 belongs. Generally, registration request includes a wide variety of different types of information that may identify the node, as well as various operating parameters associated with node 130.

Referring back now to FIG. 4A, node 130 transmits the registration request 402 along with channel map request 404 to access point 150, as mentioned. Channel map request 404 indicates that node 130 needs a list of channels available at the location of node 130, on which node 130 may communicate. Access point 150 receives registration request 402 and channel map request 404 and then transmits a registration validation request 406 and a channel map query 408 to server 154. Registration validation request 406 typically includes the information included in registration request 402, and may also include additional information, such as instructions that reflect a particular registration validation scheme. Channel map query 408 may be specifically constructed to reflect a query format expected by public database 158, such as, e.g., a MySQL query string, among other query formats.

Server 154 receives registration validation request 406 and channel map query 406 and then forwards them to public database 158. Public database 158 performs a validation procedure by analyzing registration validation request 406 and determining whether the information provided meets certain criteria. Public database 158 could, for example, determine that FCC ID 422 is a valid FCC ID, determine that node location 426 indicates a location where node 130 is allowed to reside, or determine that node antenna height 428 falls within certain parameters.

When public database 158 determines that the information provided with registration validation request 406 is valid, public database 158 may then service channel map query 408 and retrieve a list of channels that are available at the location occupied by node 130. Public database 158 then transmits a registration validation 410 and a channel map 412 to server 154. Registration validation 410 indicates that the information provided with registration validation request 406 is, in fact, valid, while channel map 412 indicates the list of channels that are available at the location occupied by node 130.

Server 154 receives the registration validation 410 and channel map 412 and forwards them to access point 150. Server 154 also stores registration validation 410 for use when subsequently re-registering node 130, as described in greater detail below in conjunction with FIG. 5A. Access point 150 receives registration validation 410 and channel map 412 and forwards them to node 130. Upon receiving registration validation 410 and channel map 412, node 130 may then select a channel from channel map 412 and commence participation in wireless mesh network 102 on the selected channel.

However, node 130 may subsequently become decoupled from wireless mesh network 102 under various circumstances. For example, node 130 could reboot, access point 150 could reboot, or node 130 could change locations and/or access points 150. As a general matter, node 130 may be affected by a variety of factors that cause node 130 to become decoupled from wireless mesh network 150. Node 130 may re-register to participate in wireless mesh network 102 by implementing a technique described in greater detail below in conjunction with FIGS. 5A-5B.

Figure 5A:
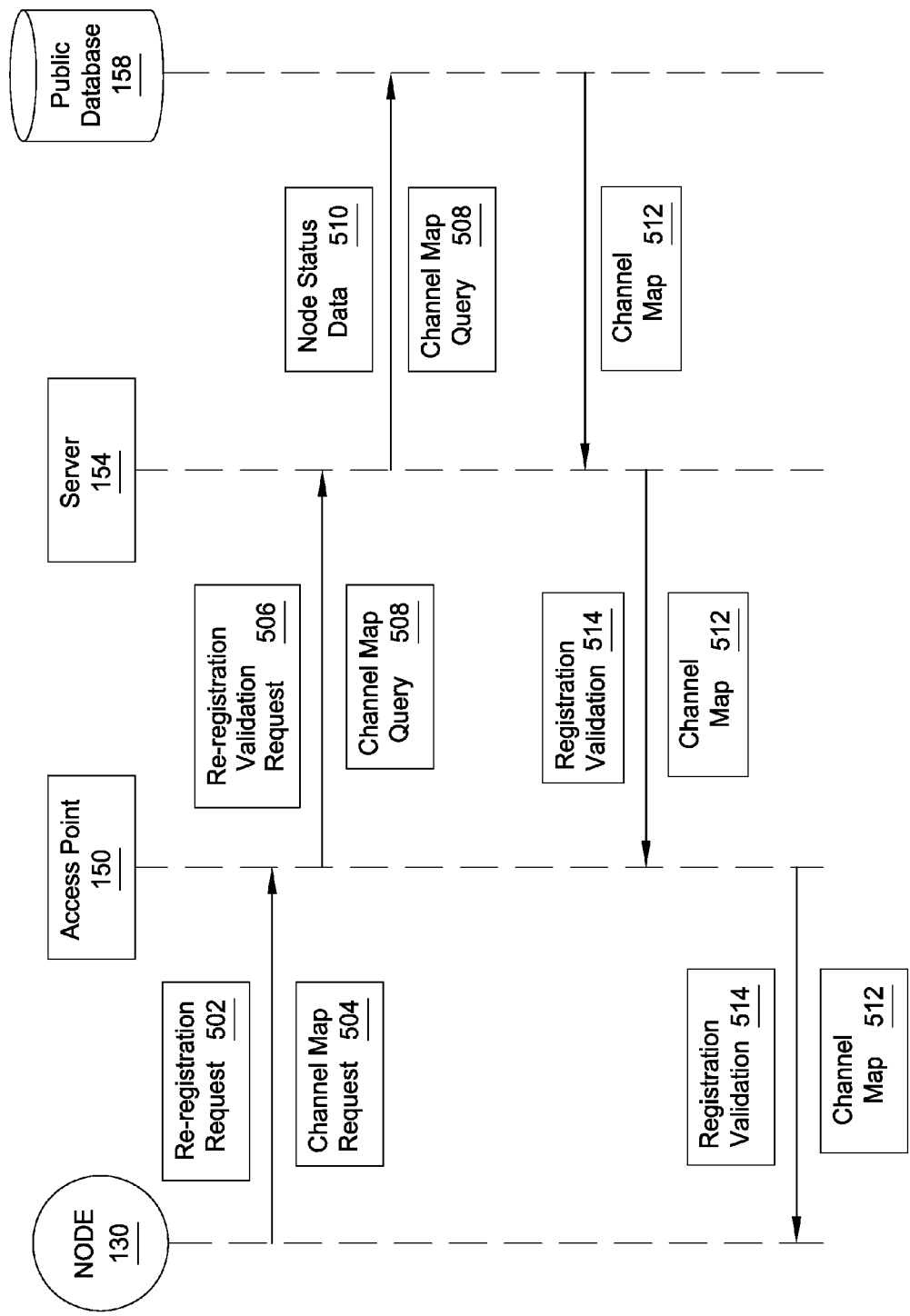
FIG. 5A is a conceptual diagram illustrating message exchanges between devices within the network system of FIG. 1 when a node re-registers to participate in the wireless mesh network of FIG. 1 after becoming decoupled from the network, according to one embodiment of the present invention.

FIG. 5A is a conceptual diagram illustrating message exchanges between devices within the network system of FIG. 1 when a node re-registers to participate in the wireless mesh network of FIG. 1 after becoming decoupled from the network, according to one embodiment of the present invention. As shown, FIG. 5A illustrates a sequence of messages that are transferred between node 130, access point 150, sever 154, and public database 158, each shown in FIG. 1. Access point 150 shown in FIG. 5A may be either of access points 150-1 and 150-2 shown in FIG. 1. The message transfer sequence shown in FIG. 5A is initiated when the node 130 attempts to re-register to participate in wireless mesh network 102 by transmitting a re-registration request 502 and a channel map request 504 to access point 150. The re-registration request 502 includes specific data that is shown in greater detail in FIG. 5B.

Figure 5B:
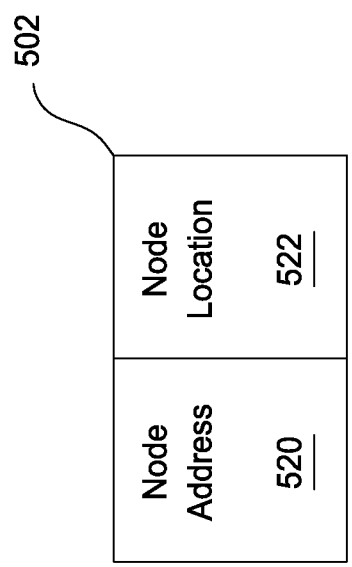
FIG. 5B is a more detailed diagram illustrating a re-registration request generated by a node when the node re-registers to participate in the wireless mesh network system of FIG. 1, according to one embodiment of the present invention.

FIG. 5B is a more detailed diagram illustrating a re-registration request generated by a node when the node re-registers to participate in the wireless mesh network system of FIG. 1, according to one embodiment of the present invention. As shown, re-registration request 502 includes a node address 520 and a node location 522. Node address 520 is typically equivalent to node address 422 shown in FIG. 4B and could thus be, e.g., a MAC address. Node location 522 typically has the same general format as node location 426 shown in FIG. 4B (e.g., latitude and longitude), although node location 522 may reflect a different physical location than node location 426 in situations where node 130 has moved after initially registering to participate in wireless mesh network 102. Generally, registration request includes a small subset of the information included within registration request 402 and, thus, represents a much smaller amount of data.

Referring back now to FIG. 5A, node 130 transmits re-registration request 502 along with channel map request 504 to access point 150, as mentioned. Channel map request 504 is similar to channel map request 404 shown in FIG. 4A, and, thus, indicates that node 130 needs a list of channels available at the location of node 130 on which node 130 may communicate. Access point 150 receives re-registration request 502 and channel map request 504 and then transmits a re-registration validation request 506 and a channel map query 508 to server 154. Re-registration validation request 506 includes similar information as re-registration request 502 (i.e., a subset of the information included in registration request 402 and registration validation request 406 of FIG. 4A). Channel map query 508 is similar to channel map query 408.

Server 154 receives re-registration validation request 506 and channel map query 506. Server 154 then performs a validation procedure by analyzing re-registration validation request 506 to determine whether the node 130 associated with the request previously registered to participate in wireless mesh network 102. In doing so, server 154 inspects re-registration validation request 506 and extracts node address 520. Server 154 then compares node address 520 to registration data 310 described above in conjunction with FIG. 3 to determine whether registration data 310 stores previous registration data associated with node 130. Previous registration data associated with node 130 indicates that a pre-existing registration occurred. In one embodiment, registration data 310 may store IP addresses assigned to nodes 130. Server 154 may be configured to map node address 520 to an IP address, and then inspect registration data 310 to determine whether that IP address was previously assigned to node 130, thereby indicating that a registration procedure was previously performed by that node 130.

When registration data 310 indicates that the node 130 previously registered, server 154 may then determine that a re-registration validation via interaction with public database 158 (or, in some cases, private database 160) is not necessary. Specifically, since node 130 previously registered, public database 158 (or private database 160, as the case may be) already stores registration information associated with that node 130, and so transmitting complete registration data to public database 158 (or private database 160) is simply unnecessary.

However, in some situations, node 130 may have changed locations since becoming decoupled from wireless mesh network 102, and so public database 158 may need to be updated to reflect the new location of node 130. Server 154 is configured to extract node location 522 from re-registration validation request 506 and incorporate this information into node status data 510 along with node address 520. Node status data 510 may also include other information associated with node 130 that may have changed, such as, e.g. other operating parameters including node antenna height, etc. Server 154 transmits node status data 510 to public database 158. Public database 158 may then retrieve information associated with node 130 based on node address 520 and subsequently update that information to reflect node location 522. In situations where node 130 has not changed locations, node status data 510 need not be transmitted to public database 158. In one embodiment, server 154 may be configured to interact with private database 160 when performing the re-registration procedure described above. However, for the sake of simplicity, private database 160 is not shown in FIG. 5A.

In one embodiment, server 154 may not be capable of explicitly validating re-registration request 506, and may need to communicate with public database 158 to perform that validation. In doing so, server 154 maps node address 520 to an FCC ID, incorporates the FCC ID into node status data 510, and then transmits node status data 510 to public database. Public database 158 may then perform the validation procedure based on the FCC ID. Although server 154 still interacts with public database 158 to perform the re-registration procedure, the amount of data transmitted by server 154 to public database 158 is far less than the amount of data transmitted with the initial registration procedure described in conjunction with FIG. 4A.

Once server 154 determines that node 130 has already been registered, server 154 then transmits channel map query 508 to public database 158. Public database 158 may then service channel map query 508 and retrieve a list of channels that are available at the location occupied by node 130.

Server 154 receives channel map 512 and forwards that channel map, along with a registration validation 514 indicating that node 130 is registered, to access point 150. As mentioned previously, server 154 may store registration validation 410 shown in FIG. 4A, e.g. during an initial registration procedure, and then re-send that registration validation as registration validation 514. Access point 150 receives channel map 512 and registration validation 514 and forwards them to node 130. Upon receiving channel map 512 and registration validation 514, node 130 may then select a channel from channel map 512 and continue participation in wireless mesh network 102 on the selected channel.

The foregoing approach may reduce network traffic by limiting the information that is transmitted across the wireless mesh network 102 when node 130 attempts to re-join that network. When node 130 has already registered to participate in wireless mesh network 102, node 130 need only transmit a subset of the registration information previously provided in order to re-register. Since server 154 stores the complete set of registration information for each node 130 that previously registered to participate in the network, server 154 may validate re-registrations independently of public database 158 (or via a limited exchange of data with that database).

Importantly, with the above approach, node registration is no longer tied specifically to individual access points 150, and so node 130 is free to migrate between access points 150 without needing to repeatedly perform the complex registration procedure described in conjunction with FIG. 4A. Conceptually, the approach described herein allows server 154 to act as a proxy mechanism in order to perform registration validations on behalf of the many different access points 150 to which node 130 may be coupled. This approach is also described in greater detail below in conjunction with FIGS. 6-8.

Figure 6:
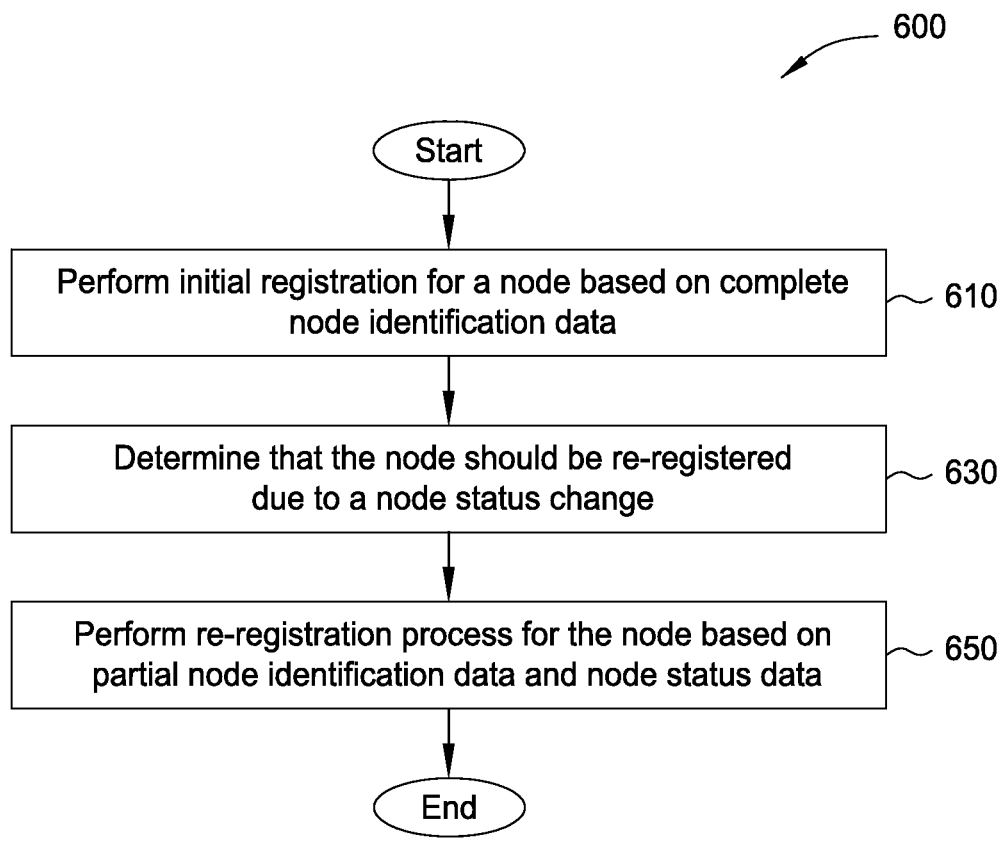
FIG. 6 is a flow diagram of method steps for registering and re-registering a node for participation in a wireless mesh network, according to one embodiment of the present invention.

FIG. 6 is a flow diagram of method steps for registering and re-registering a node for participation in a wireless mesh network, according to one embodiment of the present invention. Although the method steps are described in conjunction with the systems of FIGS. 1-5B, persons skilled in the art will understand that any system configured to perform the method steps, in any order, is within the scope of the present invention.

As shown, a method 600 begins at step 610, where node 130 initiates the registration procedure discussed above on conjunction with FIG. 4A by transmitting registration request 402 to access point 150. Node 130 transmits registration request 402 in order to become registered to participate in wireless mesh network 102. Registration request 402 includes complete node identification data, including node address 420, node FCC ID 422, serial number 424, node location 426, node antenna height 428, name of business 430, and human contact information 430. The initial registration procedure is described in greater detail below in conjunction with FIG. 7.

At step 630, node 130 determines that a re-registration is necessary in order to participate in wireless mesh network 102 because node 130 became decoupled from that network. Node 130 could be decoupled from wireless mesh network 102 due to a node status change, such as a forced reboot or a change of location, or node 130 could be decoupled because access point 150 rebooted. Node 130 could determine that a re-registration is needed due to a wide variety of different factors.

At step 650, node 130 initiates the re-registration procedure described above in conjunction with FIG. 5A by transmitting a re-registration request 502 to access point 150. Node 130 transmits re-registration request 502 in order to once again participate in wireless mesh network 102. Re-registration request 502 includes a subset of the node identification data included in registration request 402, including node address 520, and node location 522. This re-registration procedure is described in greater detail below in conjunction with FIG. 8. Node 130 may perform step 650 repeatedly, as needed, in order to re-register to participate in wireless mesh network 102.

Once node 130 is re-registered, the method 600 ends. With this approach, node 130 may change access points 150, reboot, and generally become decoupled from wireless mesh network 150, without needing to transmit complete registration information multiple times. Accordingly, network traffic composed of mostly redundant registration data may be reduced.

Figure 7:
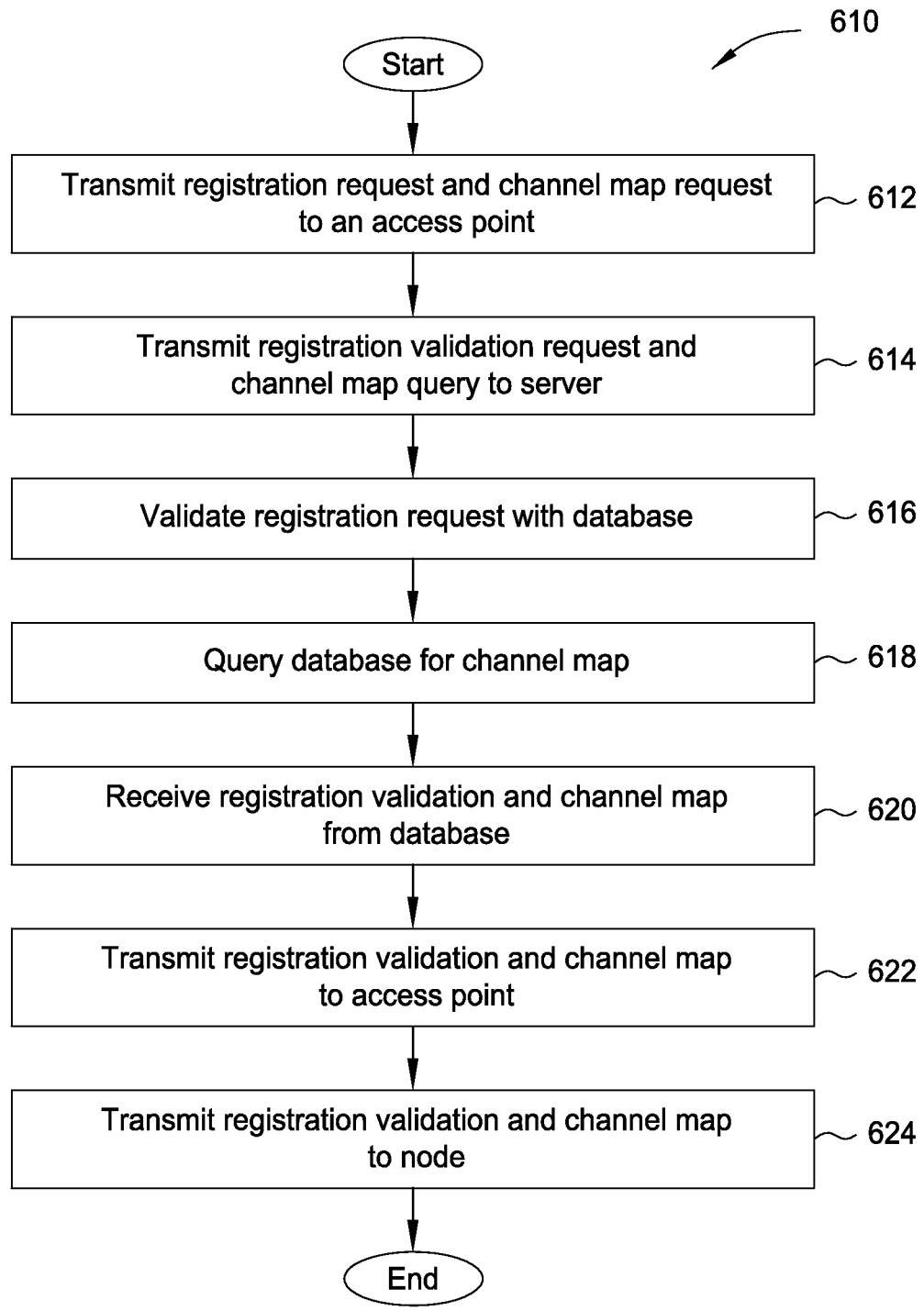
FIG. 7 is a more detailed flow diagram of method steps for registering a node for participation in the wireless mesh network, according to one embodiment of the present invention.

FIG. 7 is a more detailed flow diagram of method steps for registering a node for participation in the wireless mesh network, according to one embodiment of the present invention. Although the method steps are described in conjunction with the systems of FIGS. 1-5B, persons skilled in the art will understand that any system configured to perform the method steps, in any order, is within the scope of the present invention.

As shown, FIG. 7 illustrates step 610 of the method 600 in greater detail, starting with step 612. At step 612, node 130 transmits registration request 402 and channel map request 404 to access point 150. At step 614, access point 150 transmits registration validation request 406 and channel map query 408 to server 154. At step 616, server 154 validates the registration request 404 by transmitting registration validation request 406 to public database 158. At step 618, server 154 queries public database 158 for a channel map by transmitting channel map query 408 to public database 158. At step 620, server 154 receives registration validation 410 and channel map 412 from public database 158. At step 622, server 154 transmits registration validation 410 and channel map 412 to access point 150. At step 624, access point 150 transmits registration validation 410 and channel map 412 to node 130. Node 130 may then select a channel from channel map 412 and commence communications with other nodes 130 on wireless mesh network 102.

Node 130 may subsequently become decoupled from wireless mesh network 102, and, in response, perform the technique described below in conjunction with FIG. 8 in order to re-register to participate in that network.

Figure 8:
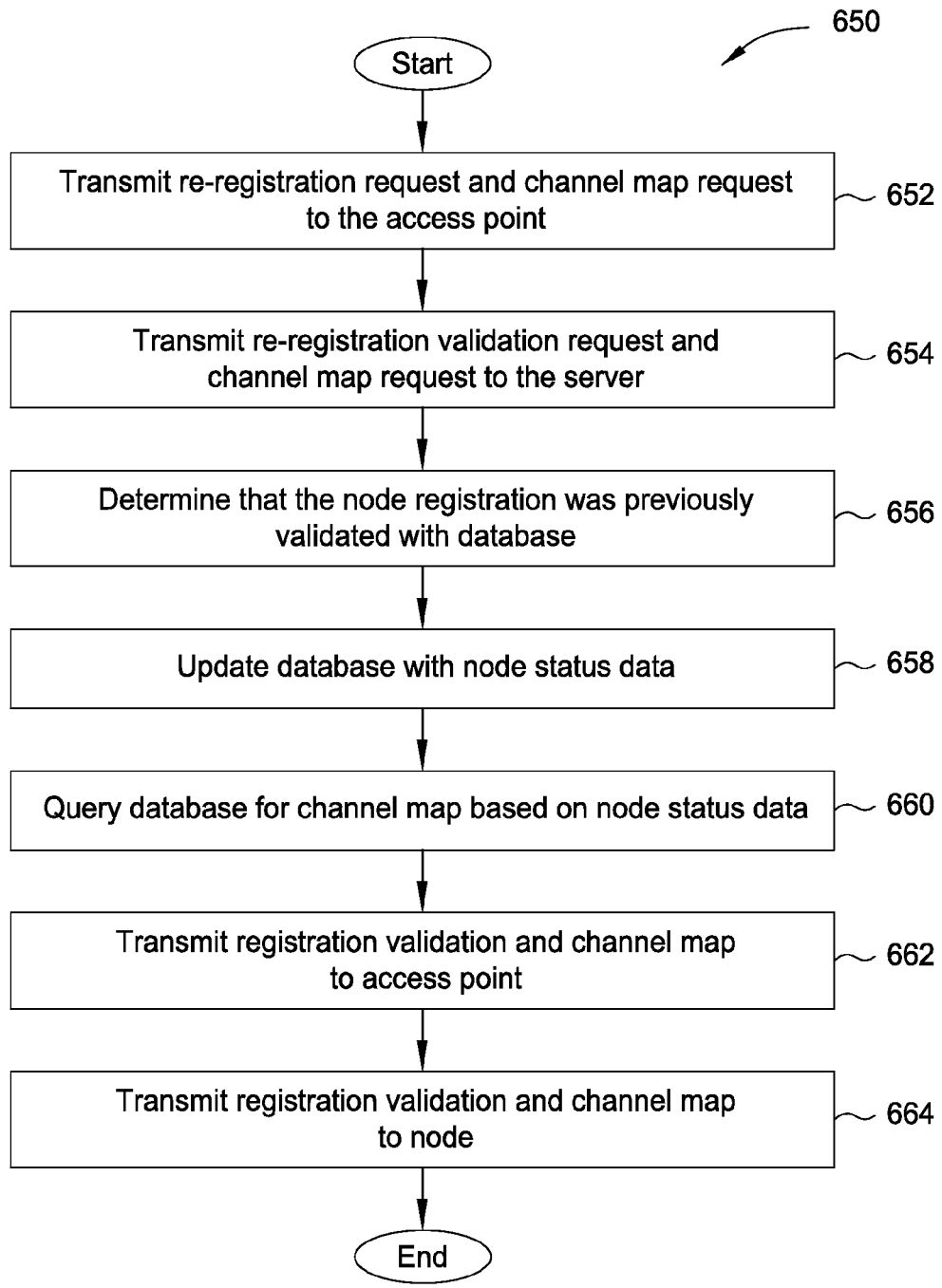
FIG. 8 is a more detailed flow diagram of method steps for re-registering a node for participation in the wireless mesh network, according to one embodiment of the present invention.

FIG. 8 is a more detailed flow diagram of method steps for re-registering a node for participation in the wireless mesh network, according to one embodiment of the present invention. Although the method steps are described in conjunction with the systems of FIGS. 1-5B, persons skilled in the art will understand that any system configured to perform the method steps, in any order, is within the scope of the present invention.

As shown, FIG. 8 illustrates step 650 of the method 600. At step 652, node 130 transmits re-registration request 502 and channel map request 504 to access point 150. At step 654, access point 150 transmits registration validation request 506 and channel map query 508 to server 154. At step 656, server 154 determines that the node registration was previously validated with public database 158, e.g. by inspecting registration data 310. At step 658, server 154 receives node status data 510 and then updates public database 158 to reflect status updates associated with node 130, including, e.g., a change of location, as needed. At step 660, server 154 queries public database 158 for a channel map by transmitting channel map query 508 to public database 158. At step 662, server 154 transmits channel map 512 and registration validation 514 to access point 150. Registration validation 514 may have been stored during the initial registration procedure performed by node 130. At step 664, access point 150 transmits channel map 512 and registration validation 514 to node 130. Node 130 may then re-join wireless mesh network 102 and continue communicating with other nodes 130 on wireless mesh network 102.

In the approach described above in conjunction with FIGS. 6-8, node re-registration is streamlined because node 130 need not transmit complete registration information when attempting to re-join wireless mesh network 102. To facilitate simplified re-registration, server 154 acts as a proxy mechanism for direct registration with public database 158, and eliminates the need for redundant registration interactions with that database. Further, server 154 may validate registrations requests for a given node that are received from multiple different access points 150 to which the node 130 may be coupled, without directly interacting with public database 150 when performing each such validation. As a result, node 130 may freely migrate between access points 150 without incurring additional transactions with public database 158.

In sum, a server acts as a proxy mechanism for node registration with a database. The node initially registers to participate in a wireless mesh network by transmitting a registration request to the server. The server forwards the request to the database, which validates the request. The server records that the registration request was, in fact, validated by the database. The node is then permitted to participate in the network. If the node becomes decoupled from the network, the node may then transmit a re-registration request to the server. Since the server recorded that the previous registration was validated, the server may then simply validate the re-registration request, without interacting with the database.

In some situations, the node may transmit updated status information to the server when performing the re-registration procedure. The server may then update the public database with the updated status information. In such a situation, the interaction between the server and the database is limited compared to the initial registration validation, as the updated status information includes a small subset of the information initially transmitted to the database during the initial node registration.

One advantage of the disclosed technique is that network traffic may be reduced because node re-registration requests include far less data than initial node registration requests. Thus, when a node migrates between access points and temporarily becomes de-coupled from the network, the node need not transmit redundant registration information in order to re-join the network.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A non-transitory computer-readable medium storing program instructions that, when executed by a processing unit, cause the processing unit to register a node to participate in a network, by performing the steps of:
   receiving from the node a first request to participate in the network, wherein the first request includes a first subset of information that identifies the node and a second subset of information associated with the node;
   permitting the node to participate in the network;
   notifying the node that participation in the network has been permitted;
   receiving from the node a second request to participate in the network after the node has become decoupled from the network, wherein the second request includes only the first subset of information;
   in response to determining that the node had previously been permitted to participate in the network based on mapping the first subset of information to an identifier previously assigned to the node, assigning the identifier to the node and determining a channel map for the node; and
   notifying the node that participation in the network has again been permitted.

2. The non-transitory computer-readable medium of claim 1, wherein the first request comprises a node address and at least one of a Federal Communications Commission (FCC) node identifier, a node serial number, a name of a business with which the node is associated, and human contact information for a person responsible for the node.

3. The non-transitory computer-readable medium of claim 2, wherein the first request further includes a current location of the node and an altitude measure of an antenna with which the node communicates.

4. The non-transitory computer-readable medium of claim 1, wherein the first subset of information comprises a node address and a current location where the node resides.

5. The non-transitory computer-readable medium of claim 1, wherein the step of permitting the node to participate in the network comprises causing a database to validate the first request, and further comprising:
   receiving a validation of the first request from the database; and
   storing the validation of the first request.

6. The non-transitory computer-readable medium of claim 5, wherein the step of determining that the node has already been permitted to participate in the network comprises:
   extracting a node address from the second request; and
   determining, based on the node address, that the validation of the first request has been previously stored, indicating that the node has already been permitted to participate in the network.

7. The non-transitory computer-readable medium of claim 5, wherein the step of determining that the node has already been permitted to participate in the network comprises:
   extracting a node address from the second request;
   mapping the node address to an internet protocol (IP) address; and
   determining that the IP address was previously assigned to the node.

8. The non-transitory computer-readable medium of claim 1, further comprising the steps of:
   determining that a status parameter included in the first request has assumed an updated value in the second request; and
   upon determining that the node has already been permitted to participate in the network, transmitting the updated value of the status parameter to a database configured to permit the node to participate in the network.

9. The non-transitory computer-readable medium of claim 8, wherein the status parameter includes at least one of an updated location where the node resides and an updated altitude measure of an antenna with which the node communicates.

10. The non-transitory computer-readable medium of claim 1, wherein the node transmits the first request when coupled to a first access point or residing in a first location, and the node transmits the second request when coupled to a second access point or residing in a second location.

11. The non-transitory computer-readable medium of claim 1, further comprising updating status data associated with the node, wherein the channel map for the node is determined based on the updated status data.

12. The non-transitory computer-readable medium of claim 1, further comprising transmitting the channel map to the node.

13. A computer-implemented method for registering a node to participate in a network, the method comprising:
   receiving from the node a first request to participate in the network, wherein the first request includes a first subset of information that identifies the node and a second subset of information associated with the node;
   permitting the node to participate in the network;
   notifying the node that participation in the network has been permitted;
   receiving from the node a second request to participate in the network after the node has become decoupled from the network, wherein the second request includes only the first subset of information;
   in response to determining that the node had previously been permitted to participate in the network based on mapping the first subset of information to an identifier previously assigned to the node, assigning the identifier to the node and determining a channel map for the node; and
   notifying the node that participation in the network has again been permitted.

14. The computer-implemented method of claim 13, wherein permitting the node to participate in the network comprises causing a database to validate the first request, and further comprising:
   receiving a validation of the first request from the database; and storing the validation of the first request.

15. The computer-implemented method of claim 14, wherein determining that the node has already been permitted to participate in the network comprises:
   extracting a node address from the second request; and
   determining, based on the node address, that the validation of the first request has been previously stored, indicating that the node has already been permitted to participate in the network.

16. The computer-implemented method of claim 14, wherein determining that the node has already been permitted to participate in the network comprises:
   extracting a node address from the second request;
   mapping the node address to an internet protocol (IP) address; and determining that the IP address was previously assigned to the node.

17. The computer-implemented method of claim 13, further comprising:
    determining that a status parameter included in the first request has assumed an updated value in the second request; and
    upon determining that the node has already been permitted to participate in the network, transmitting the updated value of the status parameter to a database configured to permit the node to participate in the network,
    wherein the status parameter includes at least one of an updated location where the node resides and an updated altitude measure of an antenna with which the node communicates.

18. The computer-implemented method of claim 13, wherein the node transmits the first request when coupled to a first access point or residing in a first location, and the node transmits the second request when coupled to a second access point or residing in a second location.

19. A computing device configured to register a node to participate in a network, comprising:
    a memory that includes a software application; and
    a processor that, when executing the software application, is configured to:
        receive from the node a first request to participate in the network, wherein the first request includes a first subset of information that identifies the node and a second subset of information associated with the node;
        permit the node to participate in the network;
        notify the node that participation in the network has been permitted;
        receive from the node a second request to participate in the network after the node has become decoupled from the network, wherein the second request includes only the first subset of information;
        in response to determining that the node had previously been permitted to participate in the network based on mapping the first subset of information to an identifier previously assigned to the node, assigning the identifier to the node and determining a channel map for the node; and
        notify the node that participation in the network has again been permitted.

20. The computing device of claim 19, wherein the processor is further configured to permit the node to participate in the network by causing the database to validate the first request, and the processor is further configured to:
    receive a validation of the first request from the database; and
    store the validation of the first request.

21. The computing device of claim 20, wherein the processor is configured to determine that the node has already been permitted to participate in the network by:
    extracting a node address from the second request; and
    determining, based on the node address, that the validation of the first request has been previously stored, indicating that the node has already been permitted to participate in the network.

22. The computing device of claim 20, wherein the processor is configured to determine that the node has already been permitted to participate in the network by:
    extracting a node address from the second request;
    mapping the node address to an internet protocol (IP) address; and
    determining that the IP address was previously assigned to the node.

* * * * *